(12) United States Patent
Rahman (10) Patent No.: US 12,004,112 B2
(45) Date of Patent: Jun. 4, 2024

(54) MINIMIZING SERVICE INTERRUPTIONS DURING TRACKING AREA UPDATE PROCEDURES

(71) Applicant: T-Mobile Innovations LLC, Overland Park, KS (US)

(72) Inventor: Muhammad Tawhidur Rahman, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 255 days.

(21) Appl. No.: 17/570,153

(22) Filed: Jan. 6, 2022

(65) Prior Publication Data

US 2023/0232358 A1 Jul. 20, 2023

(51) Int. Cl.
*H04W 60/04* (2009.01)
*H04B 17/318* (2015.01)
*H04W 24/10* (2009.01)

(52) U.S. Cl.
CPC .......... *H04W 60/04* (2013.01); *H04B 17/318* (2015.01); *H04W 24/10* (2013.01)

(58) Field of Classification Search
None
See application file for complete search history.

(56) References Cited

U.S. PATENT DOCUMENTS

| 9,560,516 | B2 | 1/2017 | Aalla et al. |
| 9,973,966 | B2 | 5/2018 | Karampatsis et al. |
| 2020/0322777 | A1* | 10/2020 | Ryu .................. H04W 76/27 |
| 2020/0322904 | A1* | 10/2020 | Hou .................. H04L 69/28 |
| 2022/0182974 | A1* | 6/2022 | Liu .................. H04W 68/005 |
| 2023/0156115 | A1* | 5/2023 | Kim .................. H04W 72/542 455/550.1 |

* cited by examiner

*Primary Examiner* — Brian S Roberts
(74) *Attorney, Agent, or Firm* — Jones Robb, PLLC (57) ABSTRACT

Systems and methods are provided for an improved tracking area update(TAU) procedure for minimizing service interruptions for wireless devices. In embodiments herein, wireless devices set a delay timer upon experiencing a triggering event. Upon termination of the triggering event, the wireless devices are able to complete the TAU procedure if the delay timer has not yet expired.

20 Claims, 8 Drawing Sheets

FIG. 8

MINIMIZING SERVICE INTERRUPTIONS DURING TRACKING AREA UPDATE PROCEDURES

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

As access nodes have evolved, networks may include a combination of multiple access node such as 4G LTE evolved NodeBs (eNodeBs) and 5G NR next generation NodeBs (gNodeBs) or alternatively may be exclusively 4G or 5G cellular systems. In both 4G and 5G cellular systems, the coverage area is broken down into small units known as 'tracking areas'. Each tracking area includes multiple cell sites. Accordingly, each tracking area is larger than the coverage area of each access node as it is the sum of entire area of all the cell sites that are grouped under one tracking area. A Tracking Area Update (TAU) is a known procedure that occurs when a wireless device moves from one tracking area to another tracking area. TAU requests are currently processed through a specific signaling sequence as governed by the third generation partnership project (3GPP) standard.

During the TAU procedure, the wireless device updates the network on its current geographical coverage area. Three main steps are currently involved in the TAU procedure. In the first step, the wireless device or user equipment (UE) sends a TAU request towards a core network (mobility management entity (MME) for 4G LTE/5G non-stand alone, access mobility management function (AMF) for 5G standalone). In a second step, the core network elements send a 'Tracking Area Update Accept' message towards the wireless device. Finally, in a third step, the wireless device acknowledges the TAU accept by sending 'TAU Complete' towards the core network via the base station, which may be an eNodeB for 4G LTE or 5G non-stand alone or a gNode B for the 5G standalone case.

Situations exist in which a wireless device may experience poor RF conditions and lose coverage just after receiving the Tracking Area Update Accept message from the core network. At some point, the wireless device recovers, for example, when it moves to a different location with better coverage. However, with currently known implementations, the wireless device flushes the TAU procedure completely upon losing coverage and retains no memory of the previous steps. Thus, the wireless device fails to send the 'TAU complete' message and is not recognized in the new tracking area. Wireless devices therefore experience a connection interruption.

Thus, the existing TAU procedures fail to adequately consider the likelihood that a wireless device will experience poor signal quality when entering a new tracking area and will thus abort the TAU procedure prior to completion. Accordingly, a solution is needed that enables wireless devices to be connected in a more efficient manner in a new tracking area despite poor signal quality.

Overview

Exemplary embodiments described herein include systems, methods, and non-transitory computer readable mediums for minimizing service interruptions during tracking area update procedures. An exemplary method includes transmitting, by a wireless device, a tracking area update request to an access node and receiving a tracking area update acceptance at the wireless device. The method further includes detecting a triggering event at the wireless device and setting a delay timer at the wireless device upon occurrence of the triggering event. The method additionally includes detecting termination of the triggering event and upon termination of the triggering event and prior to expiration of the delay timer, sending a tracking area update complete response from the wireless device to the access node.

An additional exemplary embodiment includes a system for minimizing service interruptions during tracking area update procedures. The system comprises a wireless device having at least one processor programmed to perform multiple operations. The multiple operations include transmitting a tracking area update request to an access node and receiving a tracking area update acceptance at the access node. The operations additionally include detecting a triggering event and setting a delay timer upon occurrence of the triggering event. The operations may further include detecting termination of the triggering event and upon termination of the triggering event and prior to expiration of the delay timer, sending a tracking area update complete response from the wireless device to the access node.

Yet an additional exemplary embodiment includes a non-transitory computer readable medium, programmed to perform multiple operations. The operations include transmitting a tracking area update request to an access node and receiving a tracking area update acceptance. The operations additionally include detecting a triggering event and setting a delay timer upon occurrence of the triggering event. The operations additionally include detecting termination of the triggering event and upon termination of the triggering event and prior to expiration of the delay timer, sending a tracking area update complete response from a wireless device to the access node.

DETAILED DESCRIPTION

Exemplary embodiments described herein include systems, methods, and computer readable mediums for minimizing service interruptions during tracking area update procedures. In particular, embodiments set forth herein include enhanced logic for facilitating completion of tracking area update procedures when a wireless device experiences poor RF conditions, a hardware failure, power lapse, or any other triggering event. For example, a wireless device may experience a deteriorating signal when it enters a new tracking area. Embodiments set forth herein allow completion of tracking update procedures despite the triggering event. Embodiments disclosed herein operate in networks using 4G or 5G RATs or a combination of the two RATs.

In particular, embodiments disclosed herein include an improved method for minimizing customer impact during the tracking area update procedure by introducing enhanced wireless device logic, including a delay timer. In embodiments set forth herein, the delay timer may be activated upon occurrence of two events. Specifically, the timer may be activated when the wireless device receives a TAU accept message from the core network and when the wireless device experiences a triggering event, such as a deterioration in signal quality. To detect the latter of the two events, the modem or radio chipset of the wireless device may recognize that the wireless device has lost its connection. Other triggering events may be detected as performance at a particular wireless device may be dependent on a number of factors including, for example, antenna performance parameters, network loading conditions, and wireless device location within a cell or a sector.

Upon detecting occurrence of this latter event related to connection loss, the wireless device may locally trigger the delay timer and wait for expiration of the delay timer before flushing off the TAU procedure. Accordingly, if the wireless device recovers the connection before expiration of the delay timer and re-establishes the radio resource connection (RRC) with the base station (eNB, gNB), the wireless device will send a 'TAU Complete' towards the core network. In this scenario, wireless device customers will not experience a voice call setup failure if there was a voice call in progress during the TAU procedure.

Thus, as described herein, detecting the triggering event may include detecting a signal strength meeting a predetermined threshold. For example, received signal received power (RSRP) at the wireless device may diminish to a level such that the connection is interrupted. Further, embodiments set forth herein include setting a tracking area update timer at the core network upon receipt of the tracking area update request. As will be further described herein, for maximum operational efficiency, the delay timer should be set to expire prior to the core network tracking area update timer. Thus the delay timer at the wireless device may be set to a value less than the tracking area update timer at the core network As further described herein, upon expiration of the delay timer, the wireless device may flush the tracking area update procedure.

In embodiments set forth herein, the network may be a 4G LTE network 5G NR network or a combined 4G/5G network having multiple access nodes grouped into tracking areas. Other networks are within scope of the disclosure. Wireless devices may maintain tracking area lists and travel in and out of tracking areas. Whenever a wireless device enters a new tracking area or a tracking area not on the tracking list, the wireless device may initiate the procedures described herein.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, or gNodeB, and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of minimizing service interruptions during tracking update procedures may be implemented as computer-readable instructions or methods and processing nodes on the network for executing the instructions or methods. The processing node may include a processor included in the access node or a processor included in any controller node in the wireless network that is coupled to the access node.

Figure 1:
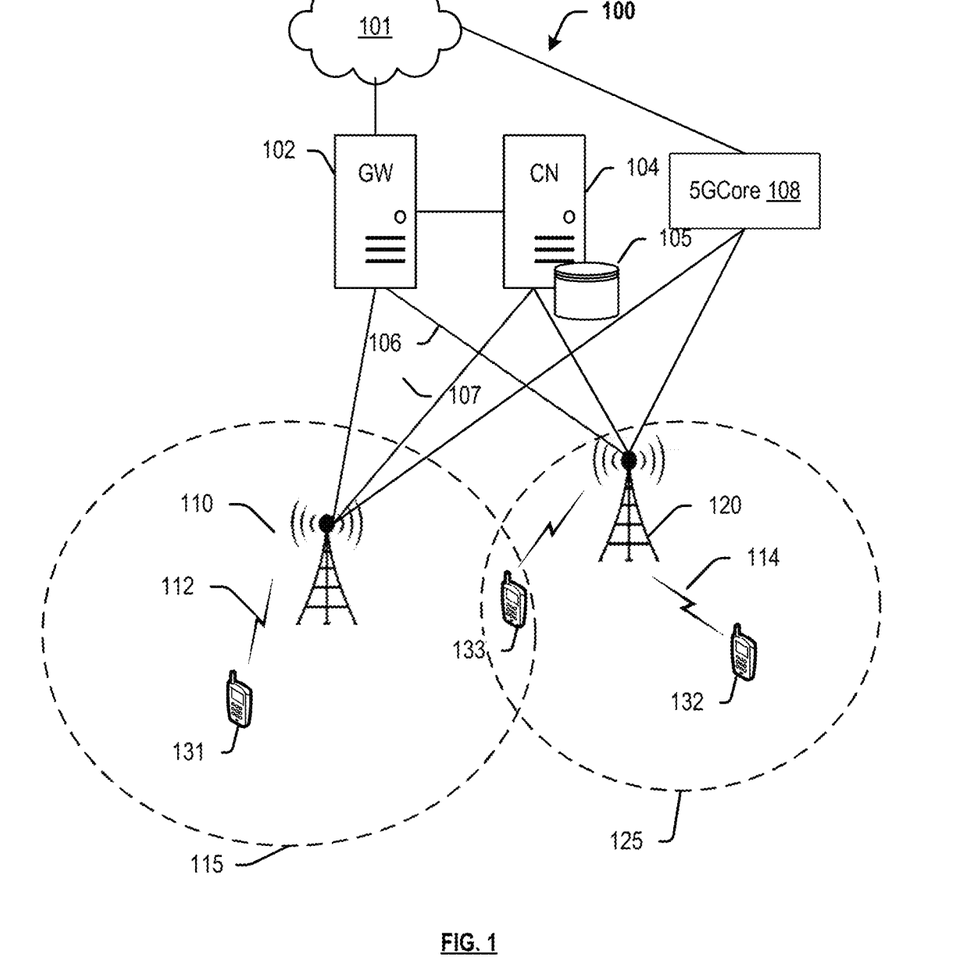
FIG. 1 depicts an exemplary system for wireless communication, in accordance with the disclosed embodiments.

FIG. 1 depicts an exemplary system 100 for use in conjunction with embodiments disclosed herein. System 100 comprises a communication network 101, gateway 102, controller node 104, core 108, access nodes 110 and 120, and wireless devices 131, 132, and 133. Access node 110 is illustrated as having a coverage area 115, and access node 120 is illustrated as having a coverage area 125. As illustrated, the coverage area 115 may be larger than the coverage area 125. This may result from the access node 110 having higher power transmission capabilities than the access node 120. For example, the access node 120 may be capable of a 320 W downlink transmission power and the access node 120 may be capable of a 120 W downlink transmission power.

Wireless devices 131, 132 are located within coverage area 115 and access network services using a wireless communication link 112 from access node 110. Wireless device 133 is located within coverage area 125 and accesses network services from access node 120 via another wireless communication link 114. Further, wireless device 133 is located within overlapping coverage area formed by an overlap of coverage areas 115, 125. For example, access nodes 110, 120 may be configured to deploy individual sectors and the overlapping coverage area may comprise any overlapping coverage area of the sectors.

In the illustration of FIG. 1, both the first access node 110 and the second access node may be connected to the communication network 101 via both an LTE path (including the gateway node 102) and an NR path (including the 5G core 108). However, in practical implementations one or both of the first access node 110 and the second access node 120 may be connected to the communication network 101 via only a single RAT path. In any event, the first access node and the second access node 110, 120 communicate with the gateway node 102, the controller node 104, and/or the 5G core 108 via respective communication links, each of which may be a direct link (e.g., an X2 link or the like).

The wireless devices 131, 132, and 133 may travel between the coverage areas 115 and 125, thus being variously connected to access nodes 110 and 120. The access nodes 110 and 120 may define the same or different tracking areas. For example, the coverage area 115 of access node 110 may be in the same tracking area as the coverage area 125 of access node 120. Alternatively, the coverage areas 115, 125 may fall into two different tracking areas. The coverage areas 115 and 125 may further be combined with other coverage areas of other access nodes (not shown) to form a larger tracking area.

Access nodes 110, 120 can be any network node configured to provide communication between wireless devices 131, 132, 133 and communication network 101, including standard access nodes and/or short range, low power, small access nodes. For instance, access nodes 110, 120 may include any standard access node, such as a macrocell access node, base transceiver station, a radio base station, gNBs, eNBs, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132, 133 may be any device, system, combination of devices, or other such communication platform capable of communicating wirelessly with access nodes 110, 120 using one or more frequency bands deployed therefrom. Wireless devices 131, 132, 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-133. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as location information for overlapping coverage area 135, positions of wireless devices 131, 132, 133, transmission power capabilities, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Further, a scheduling entity (within, for example, one or both of access nodes 110, 120, or controller node 104) may be configured to allocate resources and determine timer durations, thereby improving wireless device performance during a tracking area update procedure.

The core 108 may be a 5G core collectively implementing several control plane NFs and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a Unified Data Repository (UDR) and a UPF. Control plane NFs can provide one or more NFs based on a request-response or subscribe-notify model. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 108. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 230, thereby terminating RAN control plane and UE traffic originating on either the N1 or N2 reference interface. In the 5G core 108, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
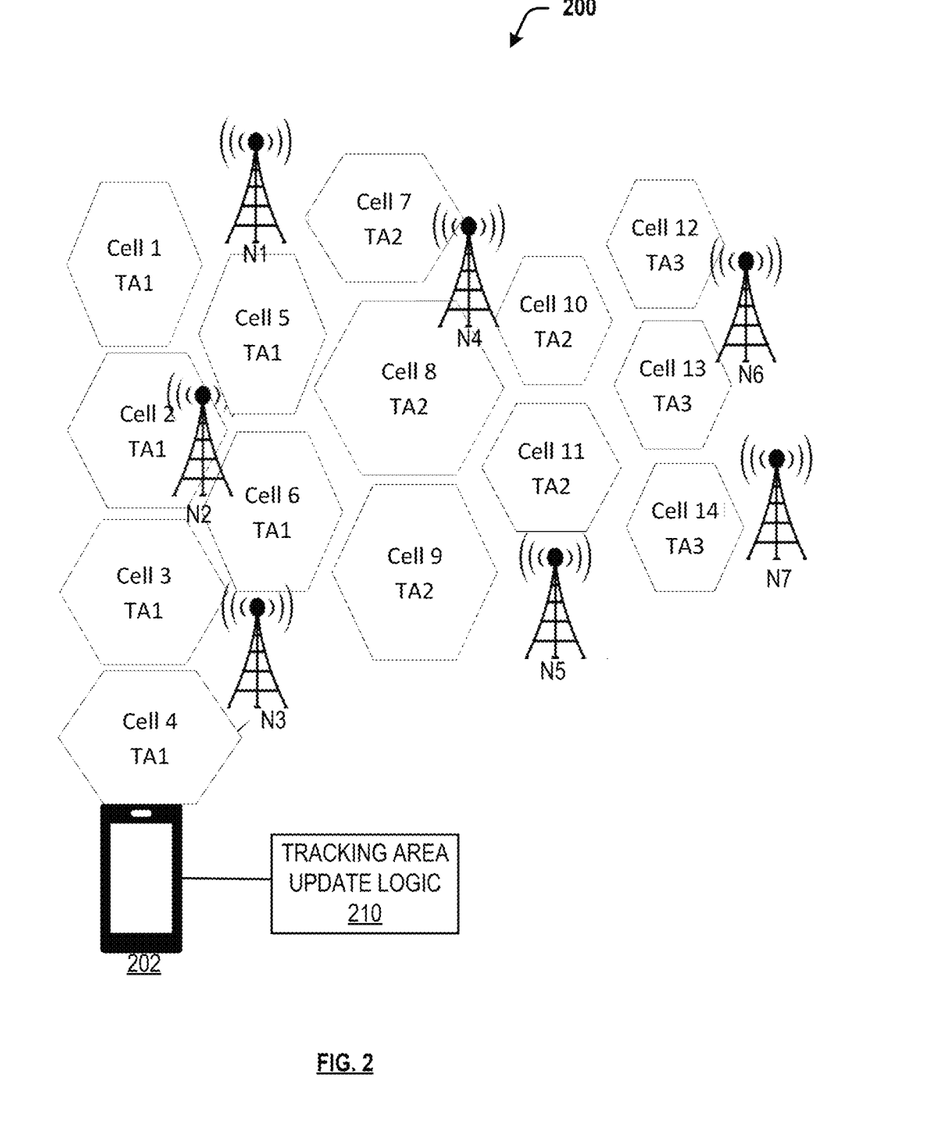
FIG. 2 illustrates an exemplary configuration of a wireless device traveling through multiple tracking areas in accordance with disclosed embodiments.

FIG. 2 illustrates an exemplary configuration 200 of a wireless device 202 traveling through multiple tracking areas TA1, TA2, and TA3 in accordance with disclosed embodiments. The wireless device 202 includes tracking area update logic 210 and travels through a network including seven access nodes or base stations N1-N7, 14 cells, and three tracking areas, TA1, TA2, and TA3. Radio coverage in the network is partitioned into groups of cells (Cell 1-Cell 14) as tracking areas (TAs). For example, in the illustrated embodiments, cells 1-6 are in tracking area 1 and are served by nodes N1, N2, and N3. Cells 7-11 form tracking area two, served by nodes N4 and N5 and cells 12-14 form tracking area three, served by nodes N6 and N7. The nodes N1-N7 may be eNodeBs, gNodeBs or any other type of node having the requisite functionality.

A core network or controller node may group cells together to produce tracking area lists (TALs). The grouping may be performed at the core network, for example, by the MME in a 4G network or by an AMF in a 5G network. The TALs are assigned by the AMF or the MME or other core network functionality to wireless devices in the network once the wireless devices register with the network. For example, the wireless device 202 proceeds to store the TAL as part of the tracking area update logic 210. When the wireless device enters an area that does not belong to its current TAL, the wireless device begins the tracking area update procedure described herein. For example, the wireless device 202 may have a TAL including TA1 and TA2, but not TA3. Thus, if the wireless device 202 enters TA3, it initiates the TAU procedure.

Figure 3:
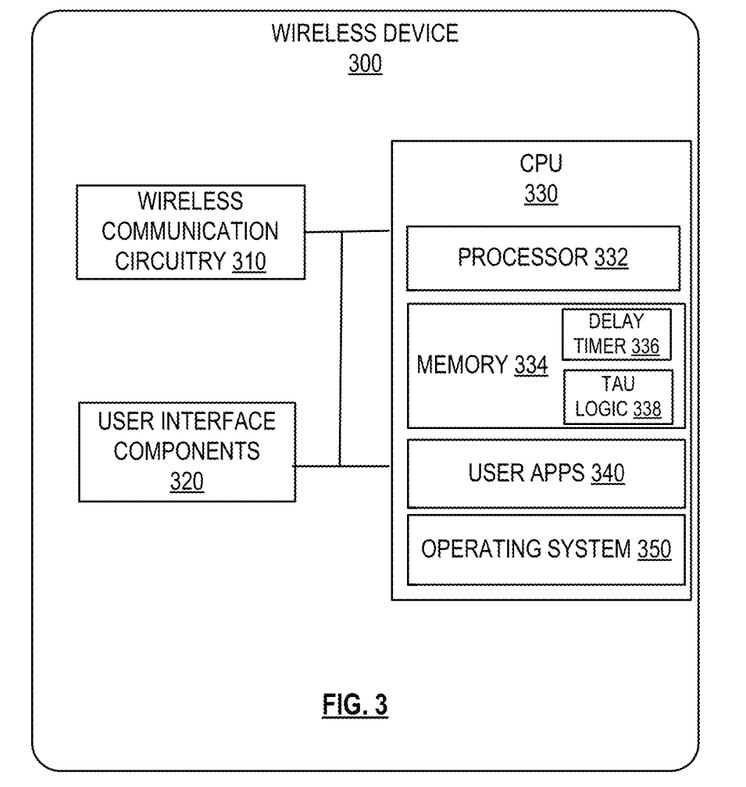
FIG. 3 depicts a wireless device in accordance with disclosed embodiments.

FIG. 3 depicts a wireless device (UE) 300 in accordance with disclosed embodiments. The wireless device may correspond to one of wireless devices 131, 132, and 133 in FIG. 1 or wireless device 202 in FIG. 2. As illustrated, the wireless device 300 includes wireless communication circuitry 310, user interface components 320, and a central processing unit (CPU) 330, processor 322, memory 334, user apps 340, and operating system 350. Components may be connected, for example, by a bus 360. These components are merely exemplary and the wireless device 300 may include a larger or smaller number of components capable of preforming the functions described herein. Wireless devices such as smartphones may have multiple microprocessors and microcontrollers. A microprocessor may have a bus to communicate with memory on separate chips and buses to communicate with the rest of the equipment. Alternatively or additionally, the mobile phone may include a System On a Chip (SoC).

The memory 334 may store a delay timer 336 and other TAU logic 338 including, for example, a tracking area list as described above. The TAU logic 338 may further include programming, that when executed by the processor 332 initiates and performs the TAU procedure described further herein with reference to FIGS. 6-9.

The wireless communication circuitry 310 may include circuit elements configured to generate wireless signals (e.g., one or more antennas) as well as interface elements configured, for example, to translate control signals from the CPU 330 into data signals for wireless output. Further, the wireless communication circuitry 310 may include multiple elements, for example to communicate in different modes with different RATs. The CPU 330 may be configured to receive, interpret, and/or respond to signals received via the wireless communication circuitry 310. The CPU 330 may be configured to receive a network command (e.g., from an access node such as the access nodes 110, 120) and, in response thereto, to join the network in a particular RAT or to switch from one RAT to another or perform other specified functions.

Figure 4:
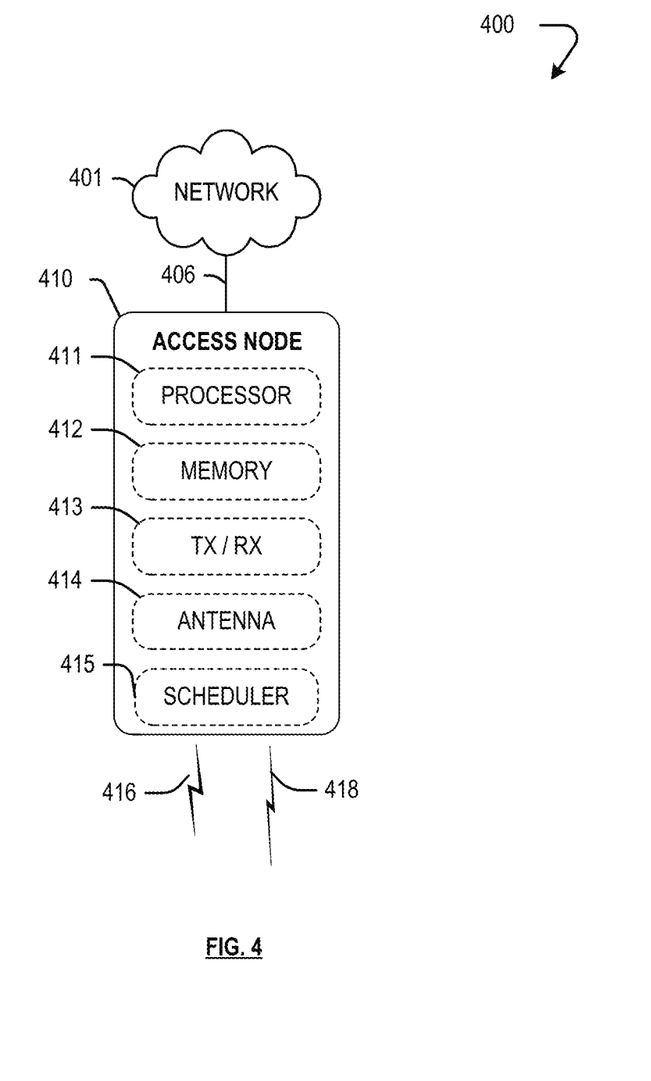
FIG. 4 depicts an access node in accordance with the disclosed embodiments.

FIG. 4 depicts an access node 410 in accordance with the disclosed embodiments. In exemplary embodiments, access node 410 can include, for example, a gNodeB or an eNodeB. Access node 410 may comprise, for example, a macro-cell access node, such as access nodes 110 or 120 described with reference to FIG. 1. Access node 410 is illustrated as comprising a processor 411, memory 412, transceiver 413, and antenna 414. Processor 411 executes instructions stored on memory 412, while transceiver 413 and antenna 414 enable wireless communication with other network nodes, such as wireless devices and other nodes. For example, wireless devices may initiate TAU procedures such that the transceivers 413 and antennas 414 receive messages from the wireless devices and pass the messages to a mobility entity in the core network. Further, the transceiver 413 and antenna 414 receive signals from the mobility entity such as an MME or AMF and pass the messages to the appropriate wireless device Scheduler 415 may be provided for scheduling resources based on the presence of the wireless devices. These features may be enabled by access node 410 comprising two co-located cells, or antenna/transceiver combinations that are mounted on the same structure. Network 401 may be similar to network 101 discussed above.

Figure 5:
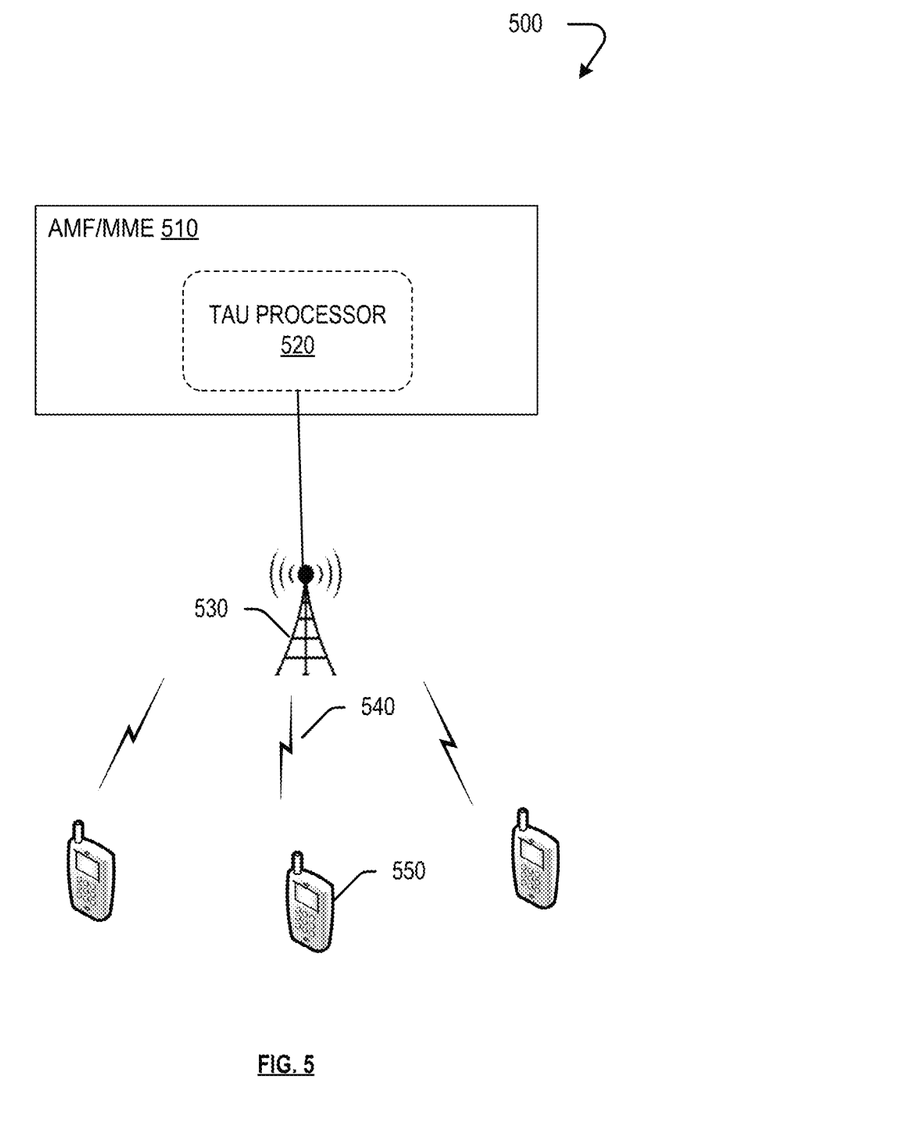
FIG. 5 depicts an exemplary configuration for communication with a core network during a tracking area update procedure in accordance with disclosed embodiments.

FIG. 5 depicts an exemplary configuration 500 for communication with a core network during a tracking area update procedure in accordance with disclosed embodiments. A core component 510, such as a 5G AMF or a 4G MME communicates with a base station 530, which further communicates over wireless communication interfaces 540 with wireless devices 550. In embodiments described herein, the TAU procedure is conducted by functionality in the wireless devices 550 and in the core component 510, while the base station 530 operates to transmit messages between the core component 510 and the wireless devices 550. Thus, when the wireless devices 550 enter a tracking area that is not on a stored tracking area list within the wireless device 550, the wireless device will send a tracking area update request to the base station 530. However, the base station 530 does not perform any operations with respect to the request and instead merely forwards the request to the core component 510. The core component 510 processes the request and sends a request acceptance response to the base station 530. The base station 530 merely forwards the acceptance response to the wireless device 550 over the wireless communication link 540 and performs no other operations with respect to the response.

Figure 6:
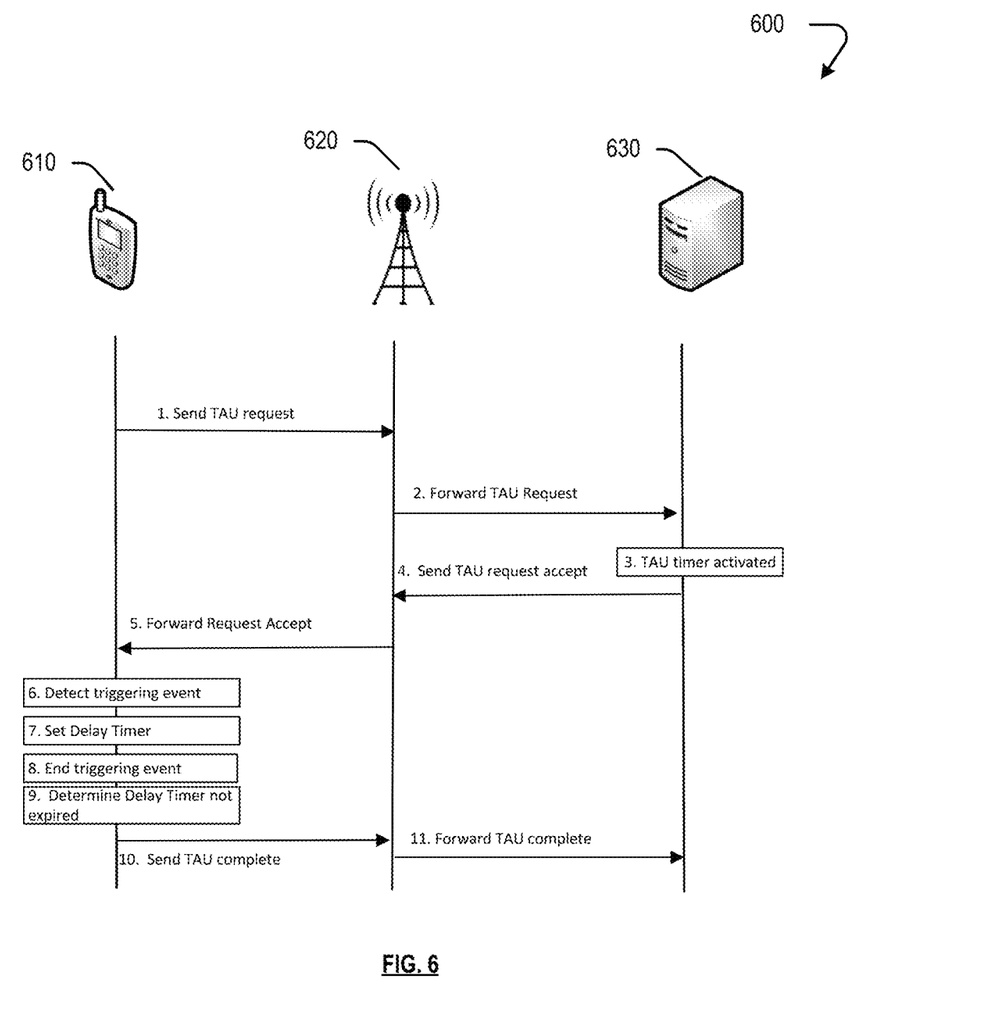
FIG. 6 depicts a flow diagram illustrating exemplary operations for completing a tracking area update procedure in accordance with disclosed embodiments.

FIG. 6 depicts a flow diagram 600 illustrating exemplary operations for completing a tracking area update procedure in accordance with disclosed embodiments. A wireless device 610 initiates a TAU procedure by sending a TAU request at step 1 to a base station 620. The initiation of the TAU request occurs when the wireless devices 610 enters a tracking area that is not stored on its tracking list. The base station 620 is disposed within the new tracking area. In step 2, the base station 620 forwards the TAU request to a core network component 630. As described above, the core network component may, for example, be an MME or an AMF, depending on the type of network.

Upon receiving the forwarded TAU request in step 2, the core component 630 activates a TAU timer. This timer may be set by the core network to an expected time for completion of the TAU procedure. After setting the TAU timer in step 3, the core network component 630 sends a TAU request accept response to the base station 620. In embodiments set forth herein, this response may include the value of the TAU timer. In step 5, the base station 620 forwards the request accept message to the wireless device 610.

Upon receiving the request accept message in step 5, the wireless device 610 may, in step 6, detect a triggering event indicating loss of connectivity. For example, the wireless device 610 may detect low signal strength by measuring RSRP and determining it meets a threshold or may detect hardware failure. In the event of such a trigger, in step 7, the wireless device 610 sets a delay timer. Further, if the request accept message of step 5 includes a TAU timer value, the wireless device 610 may set the delay timer to value less than the TAU timer value, so that the delay timer will expire prior to the TAU timer. In step 8, the wireless device 610 may detect an end of the triggering event. For example, the wireless device 610 may detect that connectivity has been restored or that signal strength has increased. When the triggering event ends in step 8, the wireless device 610 may also determine in step 9 that the delay timer has not expired. If the delay timer has not expired in step 9, the wireless devices sends a TAU complete message to the base station 620 in step 10. The base station 620 forwards the TAU complete message to the core component 630 in step 11, thus completing the TAU procedure.

Accordingly, the procedure as described herein minimizes service interruptions. Without the delay timer and TAU timer as described herein, the wireless device 610 would be likely to experience a service interruption as the core component 630 typically flushes the record of the TAU process if the core component 630 does not promptly receive a TAU complete message from the wireless device 610. In this situation, the wireless device 610 would be required to re-initiate the TAU procedure. If instead, the wireless device 610 were to send the TAU complete message, the core component 630 would have responded with a 'context not found' indication, thereby creating further service interruptions for the wireless device. If the wireless device 610 was involved in a video or gaming session, it would experience a data stall or video interruption. If the wireless device 610 was involved in a voice call, the call setup would fail.

In the scenario described herein, the wireless device 610 may, for example, by moving closer to the base station 620, regain an acceptable signal level. The wireless device logic implementing the delay timer is initiated after receiving TAU accept. The radio chipset or modem of the wireless device 610 recognizes that it also lost its radio connection and the TAU logic of the wireless device 610 locally triggers the delay timer before flushing off the TAU procedure. If the wireless device 610 recovers the radio connection before this timer expiry and re-establishes the radio resource connection (RRC) with the base station 620, the wireless device 610 will send a 'TAU Complete' response towards the network core element 630. Thus, users of the wireless device 610 will not see a voice call setup failure if a call was already in progress when the TAU procedure was initiated.

Figure 7:
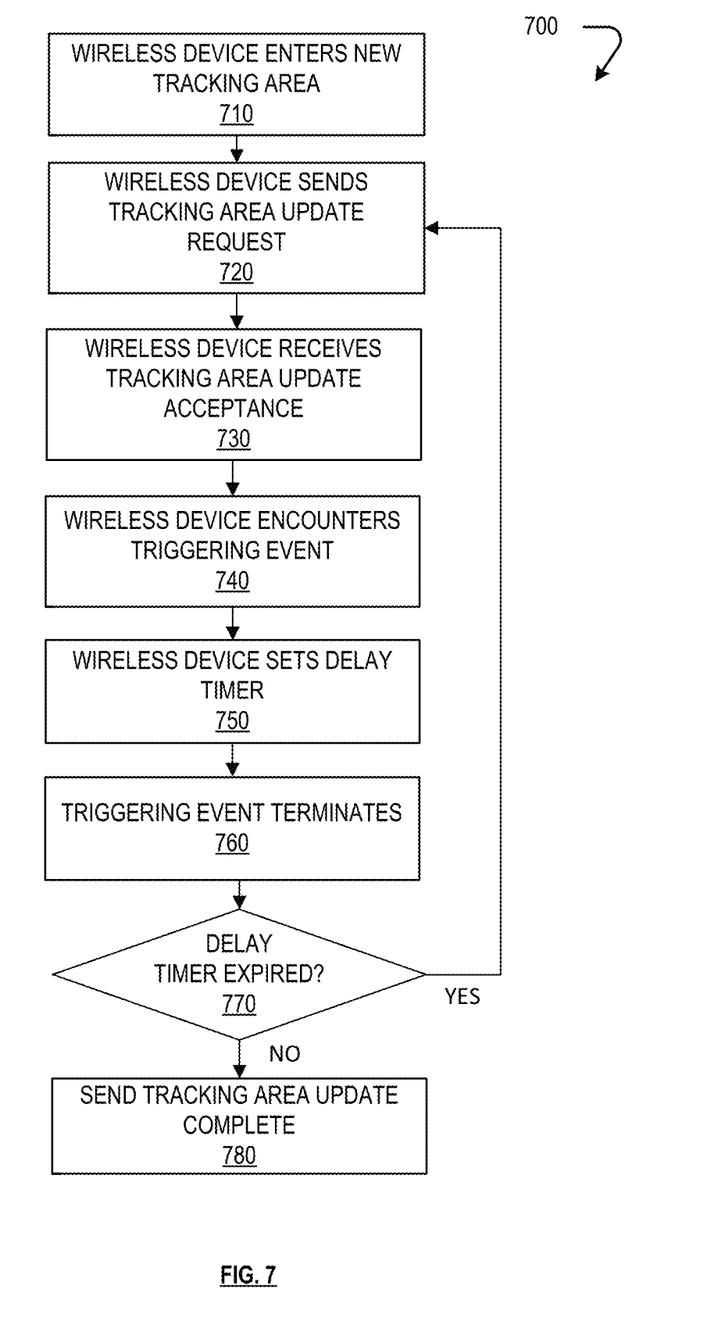
FIG. 7 depicts another exemplary method for operating a wireless device for completion of a tracking area update procedure in accordance with disclosed embodiments.
Figure 8:
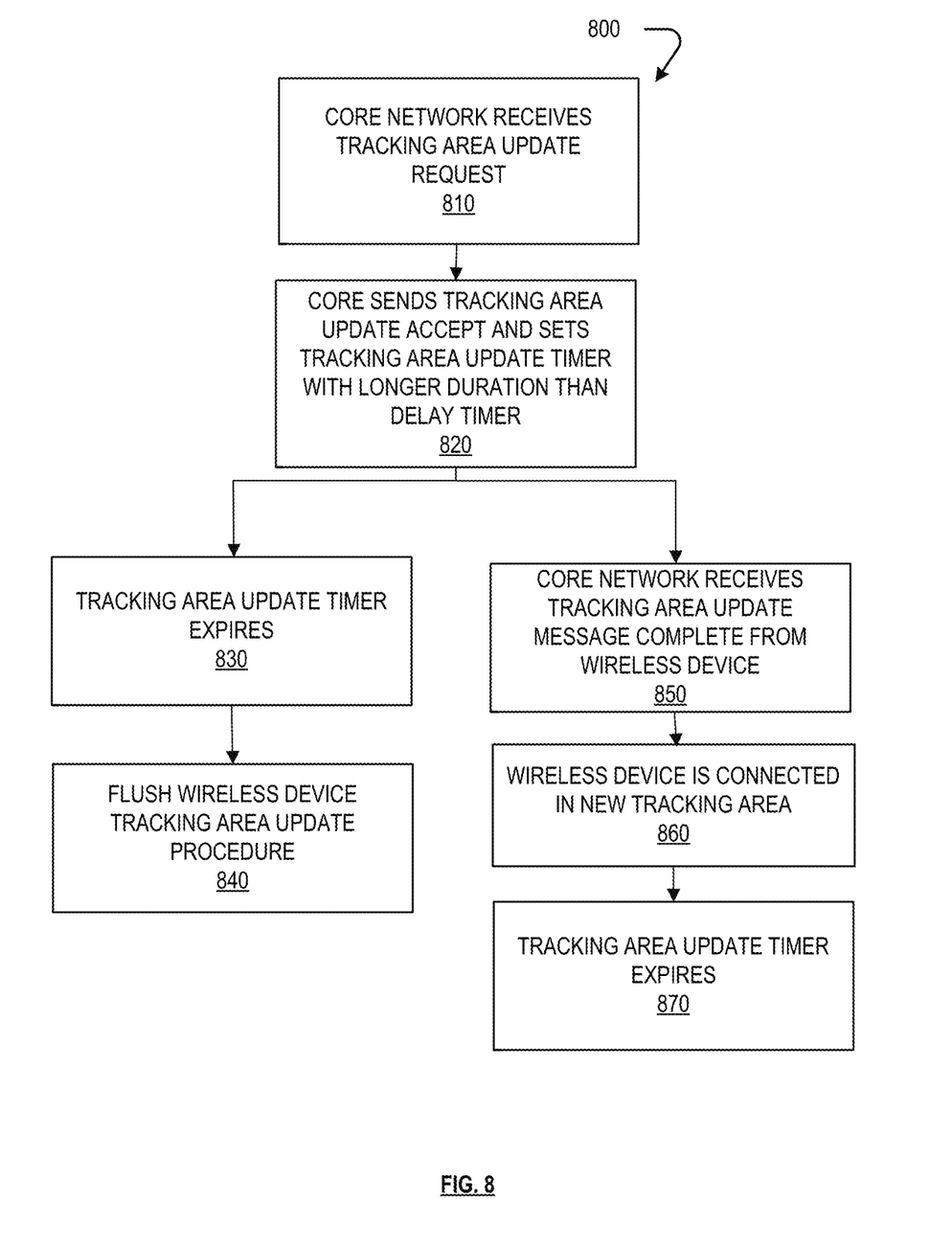
FIG. 8 illustrates an exemplary method for completing a tracking area update procedure at the core network in accordance with disclosed embodiments.

The disclosed methods for performing a TAU procedure to minimize service interruptions are further described with references to FIGS. 7 and 8 below. FIG. 7 illustrates an exemplary method 700 for performing a TAU procedure at a wireless device. Method 700 may be performed by any suitable processor discussed herein, for example, a processor included in the wireless device 300.

Method 700 starts in step 710 when the wireless device enters a new tracking area. More specifically, the wireless device enters a new tracking area and consults its stored TAL. The wireless device begins the TAU procedure in step 720 when the new tracking are is not stored on its TAL by sending a tracking area update request towards the core network. Note that if the new tracking area is on the stored TAL, it is not necessary for the wireless device 300 to send the tracking area update request at 720.

After sending the tracking area update request in step 720, the wireless device 300 receives a tracking area update acceptance in step 730. The tracking area update acceptance originates at the core network and travels through the base station to reach the wireless device 300.

In some instances, after receiving the tracking area update acceptance in step 740, the wireless device 300 may experience a triggering event in step 740. A triggering event may be or include a signal loss or deterioration or hardware failure that results in a lost connection. Upon experiencing such a triggering event in step 740, the wireless device 300 sets a delay timer in step 750 using its stored TAU logic. The delay timer is preferably set to a value in step 750 that causes it to expire prior to expiration of the TAU timer of the core network described herein. In embodiments provided herein, the wireless device 300 has stored the value of the TAU timer and in other embodiments the wireless device 300 receives in step 730 a value for the TAU timer in conjunction with the tracking area update acceptance message.

In step 760, the processor of the wireless device 300 determines that the triggering event has terminated. Upon termination of the triggering event, i.e., re-establishment of a radio connection, the wireless device 300 determines whether the delay timer has expired in step 770. If the delay timer has not expired in step 770, the wireless device 300 sends a tracking area update complete message in step 780 towards the core network in order to complete the TAU process. When the process is completed, the connected base station in the new tracking area recognizes the wireless device 300 as a connected wireless device.

In the event that the delay timer has expired in step 770, the wireless device 300 will use the tracking area update logic to re-initiate the TAU procedure by returning to step 720 to send a tracking area update request. The expiration of the delay timer indicates that the TAU timer of the core network has also expired and therefore the core network will already have flushed the previous TAU procedure and any records of the wireless device 300.

Thus, in situations where the wireless device 300 loses coverage just after receiving the TAU acceptance message from the core, the wireless device will still be able to connect to the access node in the new tracking area after it moves to different point with improved radio propagation as long as the interruption is relatively short in duration or at least shorter than the delay timer value. This reflects an improvement over existing procedures, in which the wireless device will have flushed the TAU acceptance and thus will not complete the process by sending the tracking area update complete message. When the core network does not receive the TAU complete message, it flushes all record of the wireless device FIG. 8 illustrates a method 800 for completing a TAU procedure from the perspective of the core network. Method 800 may be performed by a core network component or function, such as the MME in a 4G network, or the AMF in a 5G network. A TAU processor, such as TAU processor 520 associated with these components and functions may cause the steps described herein to be performed.

In step 810, the TAU processor 520 receives the tracking area update request from the wireless device 300 through a connected base station. In step 820, the TAU processor 520 sends a tracking area update accept message back towards the wireless device 300 and also sets a tracking area update timer with a duration longer than the delay timer of the wireless device 300. In order to perform this step, the core network may have stored the TAU timer value and may send the value of the TAU timer to the wireless device 300 along with the tracking area update accept. Further, the TAU processor may send an instruction with the tracking area update acceptance message for the wireless device 300 to set its delay timer to expire prior to the TAU timer. Alternatively, the wireless device 300 may already have stored logic indicating that the delay timer must be set to expire prior to the TAU timer.

After sending the tracking area update accept message and setting the TAU timer in step 820, the TAU processor 520 will either receive a tracking area update complete message from the wireless device 300 in step 850 or will detect that the TAU timer has expired in step 830. If the TAU timer expires in step 830 prior to the receipt of the tracking are update complete message, then the TAU processor will flush the wireless device tracking area update procedure from memory in step 840. In this instance, the wireless device 300 will be required to re-initiate the TAU procedure if and when it regains a connection within the coverage area of the access node.

Optimally, the core network receives the tracking area update complete message from the wireless device in step 850 prior to expiration of the TAU timer. Upon receipt of the tracking area update complete message by the core network in step 850, the wireless device becomes connected in the new tracking area in step 860. The tracking update timer subsequently expires in step 870.

In some embodiments, methods 700 and 800 may include additional steps or operations. Furthermore, the methods may include steps shown in each of the other methods. As one of ordinary skill in the art would understand, the methods 700 and 800 may be integrated in any useful manner.

By the methods described herein, wireless device performance can be improved, and the occurrence of service interruptions during TAU procedures can be minimized. Further, the customer service level for both 4G and 5G networks will improve in various scenarios. For example, non-Voice Over NR(VoNR) devices benefit as they rely on LTE fallback or Voice over Evolved Packet System Fall Back (VoEPSFB)). The improved TAU procedure is a part of that call flow as the wireless device moves from NR coverage in 5G to LTE coverage in 4G to establish the call in the LTE domain since voice over 5G NR (VoNR) is not supported for that wireless device. Chances of experiencing an RF interruption while a call is in progress is much higher for such VoEPSFB or Voice over 4G as fall back is much higher. Additionally, the updated TAU procedures will also help data session experiences for non voice traffic, such for example, YouTube®, Netflix®, Gaming, Facebook® upload, Facetime® etc.). The improved TAU procedure will also help minimize interruptions for other mainstream voice calls such as, for example Voice over LTE (VoLTE) and Voice over NR (VoNR).

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   transmitting, by a wireless device, a tracking area update request to an access node;
   receiving a tracking area update acceptance at the wireless device;
   detecting a triggering event at the wireless device;
   setting a delay timer at the wireless device upon occurrence of the triggering event;
   detecting termination of the triggering event; and
   upon termination of the triggering event and prior to expiration of the delay timer, sending a tracking area update complete response from the wireless device to the access node.

2. The method of claim 1, wherein detecting the triggering event comprises detecting a signal strength meeting a predetermined threshold.

3. The method of claim 2, further comprising measuring the signal strength using RSRP.

4. The method of claim 1, further comprising transmitting the tracking area update request from the access node to a core network.

5. The method of claim 4, further comprising setting a tracking area update timer at the core network upon receipt of the tracking area update request.

6. The method of claim 5, further comprising setting the delay timer to a value less than the tracking area update timer.

7. The method of claim 5, further comprising setting the tracking area update timer at the core network to a value greater than the delay timer at the wireless device.

8. The method of claim 4, further comprising sending the tracking area update request from the wireless device to a mobility management entity (MME) of the core network.

9. The method of claim 4, further comprising sending the tracking area update request from the wireless device to an access and mobility function (AMF) of the core network.

10. The method of claim 1, further comprising, upon the expiration of the delay timer, flushing the tracking area update procedure at the wireless device.

11. A system comprising:
    a wireless device having at least one processor programmed to perform multiple operations including;
    transmitting a tracking area update request to an access node;
    receiving a tracking area update acceptance;
    detecting a triggering event;

setting a delay timer upon occurrence of the triggering event;

detecting termination of the triggering event; and upon termination of the triggering event and prior to expiration of the delay timer, sending a tracking area update complete response from the wireless device to the access node.

12. The system of claim 11, wherein detecting the triggering event comprises detecting a signal strength meeting a predetermined threshold.

13. The system of claim 11, further comprising a core network having a tracking area update timer set to a value greater than the delay timer of the wireless device.

14. The system of claim 13, wherein the core network receives the tracking area update request from the access node.

15. The system of claim 13, wherein the tracking area update timer is set upon receipt of the tracking area update request.

16. The system of claim 15, wherein the wireless device sets the delay timer to a value less than the tracking area update timer.

17. The system of claim 15, wherein the core network sets the tracking area update timer at the core network to a value greater than the delay timer at the wireless device.

18. A non-transitory computer readable medium, programmed to perform multiple operations including:

transmitting a tracking area update request to an access node;

receiving a tracking area update acceptance;

detecting a triggering event;

setting a delay timer upon occurrence of the triggering event;

detecting termination of the triggering event; and upon termination of the triggering event and prior to expiration of the delay timer, sending a tracking area update complete response from a wireless device to the access node.

19. The non-transitory computer readable medium of claim 18, wherein detecting the triggering event comprises detecting a signal strength at the wireless device meeting a predetermined threshold.

20. The non-transitory computer readable medium of claim 18, wherein the operations further comprise, upon the expiration of the delay timer, flushing the tracking area update procedure at the wireless device.

* * * * *